United States Patent [19]

Propster

[11] 4,277,277

[45] Jul. 7, 1981

[54] FEEDING AGGLOMERATES TO A GLASS MELTING FURNACE

[75] Inventor: Mark A. Propster, Gahanna, Ohio

[73] Assignee: Owens-Corning Fiberglas Corporation, Toledo, Ohio

[21] Appl. No.: 98,571

[22] Filed: Nov. 29, 1979

[51] Int. Cl.³ .............................................. C03B 5/18
[52] U.S. Cl. ........................................ 65/134; 65/335
[58] Field of Search .................................. 65/134, 335

[56] References Cited

U.S. PATENT DOCUMENTS

| 3,466,160 | 9/1969 | Keefer | 65/134 X |
| 3,929,445 | 12/1975 | Zippe | 65/335 |
| 4,047,920 | 9/1977 | Armstrong | 65/335 |
| 4,184,861 | 1/1980 | Erickson | 65/134 X |

OTHER PUBLICATIONS

LeGille, "Theoretical and Practical Influences on Blast Furnace Aerodynamics by the Bell-Less Top", B.F.A. Symposium, 1975, pp. 106-112.
Heynert et al., "Five Years of Experience with the Bell-Less Top", I&SM, Mar. 1978, pp. 15-24.

Primary Examiner—Ronald Serwin
Attorney, Agent, or Firm—Ronald C. Hudgens; Patrick P. Pacella

[57] ABSTRACT

A process and apparatus for feeding glass batch agglomerates or raw batch to a glass melting furnace is disclosed. The invention employs a rotating chute or feeder which can be operated at various angles and speeds of rotation to ensure uniform pellet distribution.

18 Claims, 3 Drawing Figures

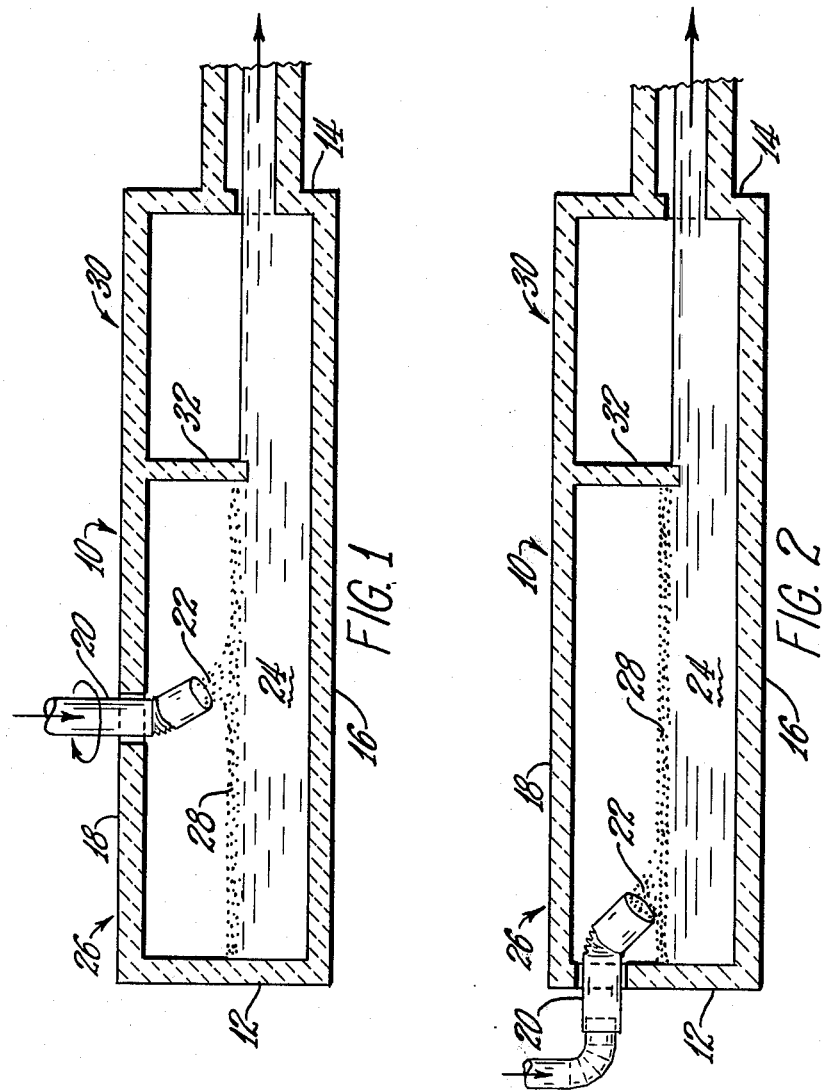

FEEDING AGGLOMERATES TO A GLASS MELTING FURNACE

TECHNICAL FIELD

This invention relates to feeding agglomerates to a glass melting furnace. More specifically, glass batch is formed into agglomerates which are preheated prior to being fed to the furnace.

BACKGROUND ART

Spectacular increases in pull rates from glass melting furnaces have been achieved during the last two decades. In connection with this increase, furnace charging has had to keep up with the corresponding demand for batch. Recent advances in glass melting such as preheated, pelletized batch are placing even greater demands on batch feeding.

Conventional batch feeders discharge glass making ingredients onto molten glass in the furnace. One example supplies batch from a carriage which extends across the width of a tank and which reciprocates back and forth over the length of the tank. The carriage can include vibratory feeders which regulate the rate of feed of the batch. Another example feeds glass batch material through inlet openings in the furnace known as the feeding doghouse. The batch may be introduced intermittently to form a blanket floating on the surface of molten glass or continuously to form a uniform blanket.

DISCLOSURE OF INVENTION

The present invention provides an improvement in feeding agglomerates to a glass melting furnace. A rotating chute or feeder which can be operated at various angles and speeds of rotation provides batch feeding which insures uniform agglomerate distribution. This device has been found to be particularly useful in electric melting furnaces. The invention also could find extensive use in the flat glass industry because of the exceptional width of these furnaces. In another embodiment, the rotating chute easily could meter hot or preheated agglomerates to bottle glass furnaces.

This device insures a uniform preheated agglomerate (pellet) distribution over the entire electric melter surface. The rotaing chute distributes raw glass batch with the same effectiveness as pellets; therefore, the device can supply batch to the melter as a backup measure should there be insufficient pellets available. With regard to conventional electric furnaces, this device could eliminate costly boom chargers and allow for total enclosure of the melter surface which would virtually eliminate particulate emissions. The use of a preheated pellet charge in a totally enclosed electric melter will allow for a substantial reduction in the bulk underglass temperature, thereby increasing furnace life.

BRIEF DESCRIPTION OF THE DRAWINGS

FIG. 1 is a drawing of the rotary chute or feeder of this invention with the rotary chute extending through the furnace crown.

FIG. 2 shows another embodiment of this invention with the rotary chute extending through the rear wall of the furnace.

BEST MODE OF CARRYING OUT INVENTION

Figure 3:
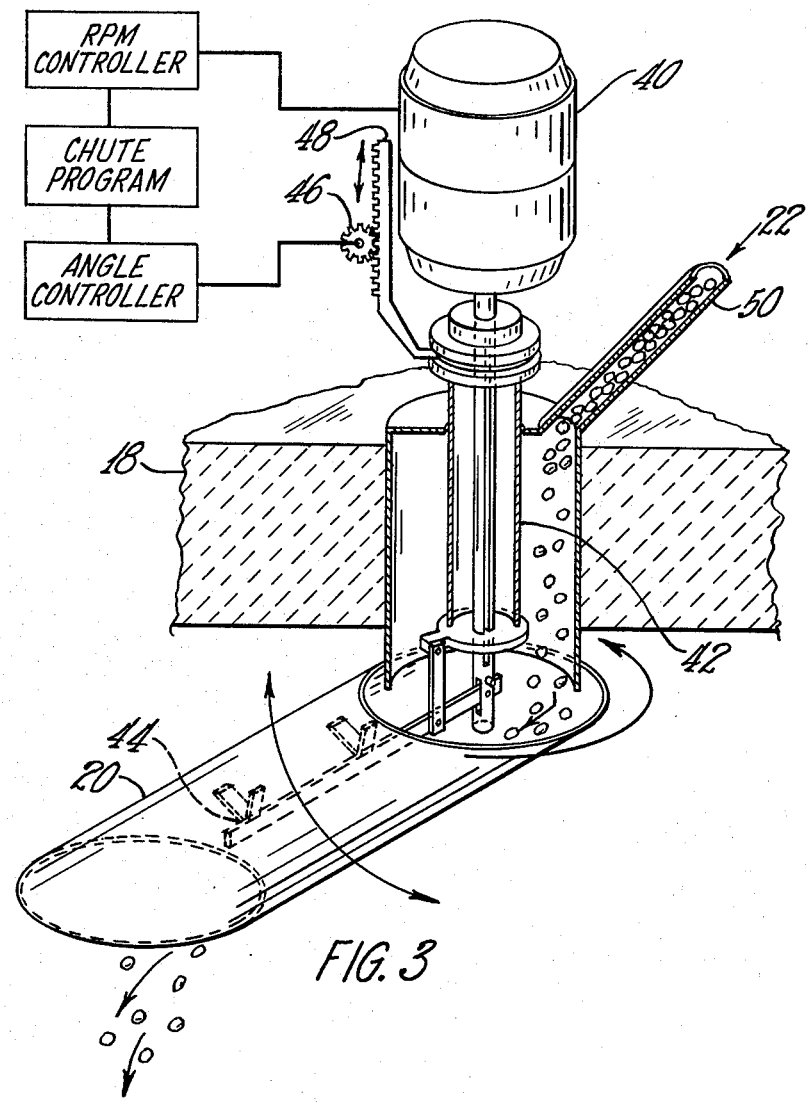
FIG. 3 illustrates the rotating chute of this invention in greater detail.

FIG. 1 shows a glass furnace 10 constructed generally of refractory blocks, so as to include a rear wall 12, a front wall 14, sidewalls (not shown), a bottom 16, and a crown or roof 18. Extending through the furnace crown 18 is rotary chute or feeder 20 which feeds agglomerates 22 onto molten glass 24 in the furnace, so that they melt in the melting portion 26 of furnace 10. The glass flows to the working end adjacent to the front wall 14 and into the refining portion 30 of the furnace. Heat is applied by burners (not shown) through ports (not shown) in the sidewalls (not shown). A suitable fuel-air mixture is fed to the burners. The melting portion 26 is separated from the refining portion 30 by a drop arch 32 (optional). Chute 20 should be water cooled (not shown) or made of a heat resistant material such as platinum or a ceramic.

In another embodiment, heat can be supplied by electrodes (not shown) for melting the glass batch agglomerates 22. The electrodes can extend through bottom 16 or the sidewalls (not shown) of furnace 10 into molten glass 24. The agglomerates 22 form a blanket 28 floating on the surface of molten glass 24 or continuously form a uniform blanket 28.

FIG. 2 shows another embodiment of this invention where rotary chute or feeder 20 extends through rear wall 12 of furnace 10 instead of through crown 18.

FIG. 3 illustrates rotary chute 20 more fully and shows means for rotating and changing the angle of chute 20.

Means for rotating chute 20 can be any motor, such as air motor 40. Air motor 40 is directly connected to main drive unit 42 which is pivotally connected to chute 20 by arm 44. The angle of chute 20 is varied by chute angle gear 46 which is engaged with the teeth on gear casing 48. Hot agglomerates 22 are fed to rotary chute 20 through feeder 50. If desired, there may be more than one feeder 50. A chute program is connected to an rpm controller which controls the speed of motor 40. The chute program also is connected to an angle controller which controls the angle of chute 20. In this way chute rotation speed and angle can be coordinated as described later in this specification. Not shown is a means for raising and lowering the entire chute assembly so that the chute can be more easily repaired and serviced.

In the event the chute 20 protrudes through back wall 12 instead of crown 18, stops and relays (not shown) will have to be employed to prevent chute 20 from coming in contact with back wall 12 and to reverse the direction of chute 20.

The present invention provides a means for satisfactorily charging preheated pellets at 1,200° F. into an electric furnace. This invention also allows for the complete enclosure over the electric melter surface which will help maximize the overall thermal efficiency of the furnace.

A full scale model (17'×17'×3.7') of a furnace superstructure was constructed in order to evaluate the rotating chute operating parameters in this geometry. The chute's intended mode of operation, i.e., low rpm with a long chute length, was modified due to the constrained chute length of three feet which allows for chute withdrawal through the crown. Retraction is a requirement for ease of repair and service to the chute. Under these conditions, a variable, high chute rotation rate at constant angle (70 degree) is required to propel the pellet to the periphery. The inner region of the melter surface is covered using low rotation at different chute inclinations. In any case, the pellet distribution over the 17'×17' surface of the furnace model was attained to within one inch of nominal. However, some flexibility is lost in the chute's operation due to its shorter length.

In the intended mode of operation, at low chute rotation, less than ten revolutions per minute, a chute length of six feet, operating at different angles, is required to distribute pellets over the entire surface of the 17'×17' model. However, as the chute rotation rate is increased, with the chute angle constant at 70 degrees from vertical, the length of chute needed to reach the walls of the model is reduced. With chute rotating at 80 RPM, the outermost regions of the model can be covered with pellets using a chute three feet in length.

Therefore, within the electric furnace a chute three feet in length could be successfully utilized. The mode of chute operation would be as follows:

(a) pellets will be spread over inner regions of the melter surface within the chute operating at low RPM and varying angle, and (b) when 70 degrees from vertical is attained, the chute angle will remain constant and the rotation rate will be increased in a programmed manner in order to uniformly distribute pellets over the remainder of the melter surface. This method of operation is capable of spreading pellets over the entire surface to within one inch deviation from nominal.

The rotating chute shown in FIG. 1 was determined to be the optimal pellet charging device because it is of simple design and allows extremely flexible operating conditions. This device alone is capable of maintaining a uniform pellet distribution over the entire electric melter surface to within one inch deviations from the mean value. It has minimal moving parts exposed to high temperature and could be withdrawn easily through the crown of the melter if replacement or repair was required. The mechanical requirements for this device are only a variable speed motor and a direct drive to vary and control the chute angle. The rotating chute also resulted in no pellet fracture during charging and the dust generation was low provided the chute to bed distance was maintained at a reasonable level.

The rotating chute was tested while functioning in a high temperature (1,200° F.) chamber for an extended time with no mechanical or operating problems. Pellets preheated to 1,200° F. were spread over a simulated melter surface within the high temperature chamber numerous times. The resultant pellet distribution was reproducible and identical to that observed with cold pellets. During these trials no wear or maintenance problems were encountered. The present design of the rotating chute has been successfully evaluated in the actual environment in which it will operate on a production furnace.

The same rotating chute system was evaluated as a powered batch charger. This will provide a backup system in case no pellets are available for the furnace. Moreover, this device could replace the costly boom chargers and enable a cold top electric melt furnace to be totally enclosed, thereby reducing particulate emissions. The rotating chute distributed raw batch over the simulated melter surface with the same uniformity as pellets. A typical electric furnace operates with a mean underglass temperature of 2,500° F. at design glass pull rates. With preheated pellets at 1,200° F., the melting rate required to convert batch to glass can be reduced by approximately 50%. Therefore, the melter bulk glass temperature can be reduced from 2,500° F. to 2,365° F. at the same glass pull rate which results in a 95% increase in refractory life over normal furnace operation.

Therefore, based solely on refractory corrosion data, the following describes the effective increase in melter life for a corresponding decrease in average electric melt bulk glass temperature.

| Increase in Melter Life | Average Melter Temperature | Bulk Glass Temperature Decrease |
| --- | --- | --- |
| 0% | 2,500° F. | 0 |
| 50% | 2,420° F. | 80 |
| 100% | 2,365° F. | 135 |
| 150% | 2,320° F. | 180 |

INDUSTRIAL APPLICABILITY

Exhaust gases from the melting of glasses in a glass melting furnace contain a large amount of heat which can be efficiently recovered and reused in the glass melting operation. Many attempts have been made to recover such heat by contact with the incoming glass batch materials. The art discloses methods for preheating agglomerated glass batch materials by heat exchange with hot gas. The hot gas may be exhaust gas from the furnace, e.g., exhaust gases taken directly from the glass melting furnace are passed concurrently through a bed of agglomerated glass batch. The art also discloses that the hot gases can be the hot gases from the furnace which previously have been used for heating the combustion air for the furnace such as in a regenerative or recuperative furnace.

In a typical electric furnace, this invention provides a means for recovering waste heat from the forehearth exhaust, riser-conditioner section, and furnace walls which can be utilized in the pellet preheating operation. If additional heat is needed for the pellet preheating operation, an energy cost saving results from the use of lower cost natural gas rather than expensive electric power. It is the cost difference between the two energy supplies that most directly affects the energy cost savings attributable to preheated, pelletized batch.

Generally, this invention is employed in a glass melting furnace from which molten glass issues. A shaft-type preheater maintains a vertical bed of agglomerates, with the preheater preferably containing an upper substantially cylindrical portion and a lower inverted frusto-conical portion. Hot exhaust gases are conveyed to a lower portion of the preheater and passed counter-currently to the gravitationally downwardly flow of the agglomerates therein so as to preheat the agglomerates to an elevated temperature. The heated agglomerates are discharged from the lower portion of the preheater and without significant cooling, are directly transmitted to a glass melting furnace such as furnace 10 in FIGS. 1 and 2 through rotary chute 20.

Agglomerating glass batch is produced in an agglomerator which is any conventional piece of equipment available in the art for combining glass forming batch ingredients and water into agglomerates. Typically, the amount of water in the agglomerates will range from 5 to 20 percent by weight. Preferably, the agglomerator will be a conventional rotary disk pelletizer. When manufacturing pellets, it is preferred to pass the pellets through a suitable sizing device such that the pellets to be further processed generally have a maximum dimension in the range of about ¼ to 1 inch and most desirably between ⅜ to about ⅝ inch. The agglomerated glass batch is at room temperature and is continuously fed counter-currently to the flow of hot exhaust gas in the preheater. The agglomerates and hot exhaust gas are contacted for a time sufficient so that cool exhaust gas are leaving the preheater. The pellets or agglomerates are heated to a temperature ranging from about 900° F. to 1,250° F. by this exchange.

The agglomerated batch is continuously fed counter-currently to a flow of hot exhaust gas in a preheater. The preheater is an upright cylindrical chamber with a conical bottom having a pellet inlet and a gas outlet at the top and a pellet outlet and gas inlet at the bottom. The temperature of the gas is about 1,200° F. While in the preheater, the pellets and hot exhaust gas are intimately contacted for a time sufficient so that the cool exhaust gas leaving the heat exchanger is about 500° F. Under the conditions, the agglomerates are heated to about 1,200° F. The agglomerates then are fed to a glass melting furnace as described above.

I claim:

1. A furnace for the continuous production of molten glass comprising:
    an enclosure for holding a volume of molten glass provided with an inlet opening at a crown wall through which glass batch agglomerates or raw glass batch may be introduced onto the molten glass and a longitudinally displaced outlet opening through which molten glass may be withdrawn;
    means for supplying heat to said enclosure for melting the agglomerates or raw batch;
    a rotary chute wherein the rotary chute extends through said inlet opening through which the agglomerates or raw batch may be introduced onto the molten glass;
    means for varying the angle of the chute; and
    means for rotating the chute at varying speeds.

2. A furnace for the continuous production of molten glass comprising:
    an enclosure for holding a volume of molten glass provided with an inlet opening at a crown wall through which glass batch agglomerates or raw glass batch may be introduced onto the molten glass and a longitudinally displaced outlet opening through which molten glass may be withdrawn;
    a plurality of elongated electrodes extending through a sidewall or a bottom wall of the furnace for melting the agglomerates or raw batch;
    a rotary chute wherein the rotary chute extends through said inlet opening through which the agglomerates or raw batch may be introduced onto the molten glass;
    means for varying the angle of the chute; and
    means for rotating the chute at varying speeds.

3. A furnace according to claims 1 or 2 including means for preheating the agglomerates.

4. A furnace according to claims 1 or 2 wherein the means for varying the angle of the chute is a chute angle gear engaged with a gear casing attached to the chute.

5. A furnace according to claims 1 or 2 wherein the means for rotating the chute is a variable speed motor attached to the chute by direct drive.

6. A furnace according to claims 1 or 2 wherein the chute is at an angle varying up to 90° from vertical.

7. A furnace according to claim 5 wherein the chute is at an angle of 70° from vertical.

8. A furnace according to claims 1 or 2 including means for operating the chute as low as 10 revolutions per minute.

9. A furnace according to claims 1 or 2 including means for operating the chute as high as 80 revolutions per minute.

10. A furnace according to claims 1 or 2 wherein the chute has a length ranging from 1 to 10 feet.

11. A furnace according to claims 1 or 2 wherein the chute has a length ranging from 3 to 6 feet.

12. A furnace for the continuous production of molten glass comprising:
    an enclosure for holding a volume of molten glass provided with an inlet opening at a rear wall through which glass batch agglomerates or raw glass batch may be introduced onto the molten glass and a longitudinally displaced outlet opening through which molten glass may be withdrawn;
    a plurality of elongated electrodes extending through a sidewall or a bottom wall of the furnace for melting the agglomerates or raw batch;
    a rotary chute wherein the rotary chute extends through said inlet opening through which the agglomerates or raw batch may be introduced onto the molten glass;
    means for varying the angle of the chute; and
    means for rotating the chute.

13. A furnace for the continuous production of molten glass comprising:
    an enclosure for holding a volume of molten glass provided with an inlet opening at a rear wall through which glass batch agglomerates or raw glass batch may be introduced onto the molten glass and a longitudinally displaced outlet opening through which molten glass may be withdrawn;
    means for supplying heat to said enclosure for melting the agglomerates or raw batch;
    a rotary chute wherein the rotary chute extends through said inlet opening through which the agglomerates or raw batch may be introduced onto the molten glass;
    means for varying the angle of the chute; and
    means for rotating the chute.

14. A continuous process for making molten glass wherein glass batch agglomerates or raw glass batch are introduced into a furnace through an inlet opening of the furnace to form a blanket of unmelted batch on the surface of a pool of molten glass within the furnace, the agglomerates or raw batch being deposited onto less than the full width of the pool of molten glass so as to form a blanket covering less than the full width of the pool of molten glass and extending longitudinally into the furnace from the inlet end toward an outlet at the opposite end, including the step of introducing the agglomerates or raw batch in a rotating manner wherein the agglomerates or raw batch are introduced at an angle varying up to 90° from vertical and at a speed of rotation varying from 5 to 100 revolutions per minute.

15. A continuous process for making molten glass wherein glass batch agglomerates or raw glass batch are introduced into a furnace through an inlet opening of the furnace to form a blanket of unmelted batch on the surface of a pool of molten glass within the furnace, the batch material being deposited onto the full width and length of the pool of molten glass so as to form a blanket covering the full width and length of the pool of molten glass including the step of introducing the agglomerates or raw batch in a rotating matter wherein the agglomerates or raw batch are introduced at an angle varying up to 90° from vertical and at a speed of rotation varying from 5 to 100 revolutions per minute.

16. A process according to claims 14 or 15 wherein the agglomerates are introduced at an angle of 70° from vertical and at a speed of rotation varying from 10 to 80 revolutions per minute.

17. A process according to claims 14 or 15 wherein the agglomerates are preheated to a temperature varying from 900° F. to 1,250° F.

18. A process according to claims 14 or 15 wherein the agglomerates are preheated to a temperature of 1,200° F.

* * * * *